United States Patent
Manolakos et al.

(10) Patent No.: US 11,343,037 B2
(45) Date of Patent: May 24, 2022

(54) TRANSMISSION CONFIGURATION INDICATION STATES WITH QUASI-COLLOCATION GROUPS

(71) Applicant: QUALCOMM Incorporated, San Diego, CA (US)

(72) Inventors: Alexandros Manolakos, San Diego, CA (US); Makesh Pravin John Wilson, San Diego, CA (US); Tao Luo, San Diego, CA (US); Bilal Sadiq, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,497

(22) Filed: Feb. 14, 2019

(65) Prior Publication Data

US 2019/0260532 A1    Aug. 22, 2019

(30) Foreign Application Priority Data

Feb. 16, 2018    (GR) ............................... 20180100064

(51) Int. Cl.
*H04L 5/00* (2006.01)
*H04W 76/27* (2018.01)
(Continued)

(52) U.S. Cl.
CPC ............ *H04L 5/0048* (2013.01); *H04L 5/005* (2013.01); *H04L 5/0023* (2013.01);
(Continued)

(58) Field of Classification Search
CPC ..... H04L 5/0048; H04L 5/0023; H04L 5/005; H04L 5/0051; H04L 5/0094; H04W 76/27;
(Continued)

(56) References Cited

U.S. PATENT DOCUMENTS

2015/0358848 A1    12/2015    Kim et al.
2016/0142189 A1 *    5/2016    Shin ...................... H04L 5/0048
                                                                370/329
(Continued)

FOREIGN PATENT DOCUMENTS

EP    2654333 A1    10/2013
EP    3480965 A1 *    5/2019    ............... H04B 7/04
(Continued)

OTHER PUBLICATIONS

Ericsson, "WF on QCL Indication for DL Physical Channels", Sep. 2017, pp. 2-3 and 6-8; (Year: 2017).*
(Continued)

*Primary Examiner* — Jenee Holland
*Assistant Examiner* — Latresa A McCallum
(74) *Attorney, Agent, or Firm* — Qualcomm Incorporated

(57) ABSTRACT

A base station may transmit a quasi-collocation (QCL) relationship indication to a user equipment (UE) that indicates different QCL groups (e.g., QCL relationships corresponding to different port groups). The QCL relationship indication may include a tuple of transmission configuration indication (TCI)-states, TCI-states configured with TCI-state-sets, or multiple TCI-states indicated via an extended media access control (MAC) control element (CE). The QCL relationship indication may indicate a QCL relationship between one or more port groups of a first reference signal set and a plurality of port groups associated with a target reference signal. For example, the QCL relationship indication may indicate two QCL groups, where each QCL group includes a QCL relationship between a reference signal resource and a port group associated with a target reference signal. Using QCL group information, the UE may perform channel estimation for demodulating target reference signals, using the QCL antenna port group.

26 Claims, 8 Drawing Sheets

(51) Int. Cl.
*H04W 72/04* (2009.01)
*H04W 88/08* (2009.01)

(52) U.S. Cl.
CPC .......... *H04L 5/0051* (2013.01); *H04L 5/0094* (2013.01); *H04W 72/042* (2013.01); *H04W 76/27* (2018.02); *H04W 88/08* (2013.01)

(58) Field of Classification Search
CPC ... H04W 72/042; H04W 88/08; H04W 76/10; H04B 1/38; H04B 7/15; H04M 1/72
See application file for complete search history.

(56) References Cited

U.S. PATENT DOCUMENTS

2018/0323830 A1\* 11/2018 Park ........................ H04L 25/02
2019/0132828 A1\* 5/2019 Kundargi ............... H04B 7/088
2019/0141691 A1\* 5/2019 Kwon .................. H04W 72/046
2019/0253220 A1\* 8/2019 Kim ...................... H04L 5/0053

FOREIGN PATENT DOCUMENTS

WO   WO-2014129716 A1   8/2014
WO   WO-2018031807 A1   2/2018

OTHER PUBLICATIONS

International Search Report and Written Opinion—PCT/US2019/018195—ISA/EPO—dated May 31, 2019.
International Preliminary Report on Patentability—PCT/US2019/018195, The International Bureau of WIPO—Geneva, Switzerland, dated Aug. 27, 2020.

\* cited by examiner

TRANSMISSION CONFIGURATION INDICATION STATES WITH QUASI-COLLOCATION GROUPS

CROSS REFERENCES

The present Application for Patent claims the benefit of Greece Provisional Patent Application No. 20180100064 by Manolakos, et al., entitled "Transmission Configuration Indication States With Quasi-Collocation Groups," filed Feb. 16, 2018, assigned to the assignee hereof, and expressly incorporated by reference herein.

BACKGROUND

The following relates generally to wireless communications, and more specifically to transmission configuration indication (TCI) states indicating quasi-collocation (QCL) groups.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may communicate with a UE using multiple antennas. Data streams may be mapped to the antennas using antenna ports. In some cases, a base station may transmit an indication to a UE of the QCL relationships between antenna ports used for downlink communications with the UE. Such an indication may be referred to as a TCI. Different TCI-states may correspond to different QCL relationships between antenna ports used for downlink communication with a UE. For example, a TCI-state may indicate a QCL relationship between a reference signal resource (e.g., a tracking reference signal (TRS), a synchronization signal block (SSB), a channel state information reference signal (CSI-RS), etc.) and a UE target reference signal (e.g., demodulation reference signal (DM-RS)). However, in some cases, a UE may use different port configurations (e.g., for DM-RS), which may affect QCL relationships. Improved TCI-state signaling may thus be desired.

SUMMARY

In some wireless communications systems, a base station may communicate with a user equipment (UE) using multiple antennas. Data streams may be mapped to the antennas using antenna ports. In some cases, a base station may transmit an indication to a UE of the quasi-collocation (QCL) relationships between antenna ports used for downlink communications with the UE. Such an indication may be referred to as a transmission configuration indication (TCI). Different TCI-states may correspond to different QCL relationships between antenna ports used for downlink communication with a UE. QCL relationship indications (e.g., improved TCI-state indications described herein) may indicate QCL groups, which may refer to QCL relationships between antenna ports of downlink reference signal resources and port groups of target reference signals (e.g., QCL relationships between port groups of channel state information reference signal (CSI-RS) and demodulation reference signal (DM-RS) port groups).

A base station may transmit a QCL relationship indication to a UE. The QCL relationship indication may include a tuple of TCI-states, TCI-states with TCI-state-sets, or two TCI-states indicated via an extended media access control (MAC) control element (CE) indicator or two DCI fields. The QCL relationship indication may indicate a QCL relationship between one or more port groups of a first reference signal set and a plurality of port groups associated with a second reference signal set. For example, the QCL relationship indication may indicate two QCL groups, where each QCL group includes a QCL relationship between a port group of the first reference signal set (e.g., a reference signal resource) and a port group associated with the second reference signal set (e.g., a port group associated with a target reference signal).

For example, UE may receive a tuple of TCI-states for a first reference signal set, where each TCI-state of the tuple indicates a QCL relationship for one of a plurality of port groups associated with the second reference signal set. In some cases, the first TCI-state of the tuple may correspond to a first port group (e.g., DM-RS ports 1-4) and the second TCI-state of the tuple may correspond to a second port group (e.g., DM-RS ports 5-8). As another example, a TCI-state may include multiple TCI-state-sets, and each TCI-state-set may correspond to different port groups the second set of reference signals (e.g., a TCI-state-set may correspond to a QCL group). That is, TCI-states may be configured with TCI-state-sets that indicate QCL relationships between a port group of a reference signal resource (e.g., of the first reference signal set) and different port groups associated with a target reference signal (e.g., of the second reference signal set). As yet another example, a UE may receive an extended MAC CE (e.g., an extended bit indicator, two DCI fields, etc.) that indicates two (or more) TCI-states, where each TCI-state is mapped to a corresponding QCL group based on the mapping indicated by the MAC CE.

A method of wireless communication is described. The method may include receiving, over a wireless channel, a message from a base station including an indication of a QCL relationship between one or more port groups of a first reference signal set and a plurality of port groups associated with a second reference signal set, and obtaining reference signal measurements for reference signals associated with the reference signal port groups based at least in part on the indicated QCL relationship. In some cases, the method may further include transmitting the reference signal measurements to the base station over the wireless channel.

An apparatus for wireless communication is described. The apparatus may include means for receiving, over a wireless channel, a message from a base station including an indication of a QCL relationship between one or more port groups of a first reference signal set and a plurality of port groups associated with a second reference signal set, and means for obtaining reference signal measurements for reference signals associated with the reference signal port groups based at least in part on the indicated QCL relationship. In some cases, the apparatus may further include means for transmitting the reference signal measurements to the base station over the wireless channel.

Another apparatus for wireless communication is described. The apparatus may include a processor, memory in electronic communication with the processor, and instructions stored in the memory. The instructions may be operable to cause the processor to receive, over a wireless channel, a message from a base station including an indication of a QCL relationship between one or more port groups of a first reference signal set and a plurality of port groups associated with a second reference signal set, and obtain reference signal measurements for reference signals associated with the reference signal port groups based at least in part on the indicated QCL relationship. In some cases, the instructions may be further operable to cause the processor to transmit the reference signal measurements to the base station over the wireless channel.

A non-transitory computer-readable medium for wireless communication is described. The non-transitory computer-readable medium may include instructions operable to cause a processor to receive, over a wireless channel, a message from a base station including an indication of a QCL relationship between one or more port groups of a first reference signal set and a plurality of port groups associated with a second reference signal set, and obtain reference signal measurements for reference signals associated with the reference signal port groups based at least in part on the indicated QCL relationship. In some cases, the instructions may be further operable to cause the processor to transmit the reference signal measurements to the base station over the wireless channel.

Some examples of the method, apparatus, and non-transitory computer-readable medium described above may further include processes, features, means, or instructions for receiving a tuple of TCI-states for the first reference signal set, wherein each TCI state of the tuple indicates one of the plurality of port groups associated with the second reference signal set. Some examples of the method, apparatus, and non-transitory computer-readable medium described above may further include processes, features, means, or instructions for receiving a RRC message indicating a common pool of TCI states.

In some examples of the method, apparatus, and non-transitory computer-readable medium described above, the RRC message includes a MAC CE command. In some examples of the method, apparatus, and non-transitory computer-readable medium described above, a first TCI state of the tuple corresponds to a first port group of the plurality of port groups and a second TCI state of the tuple corresponds to a second port group of the plurality of port groups.

Some examples of the method, apparatus, and non-transitory computer-readable medium described above may further include processes, features, means, or instructions for receiving a RRC message including a sequence indicating the correspondence. In some examples of the method, apparatus, and non-transitory computer-readable medium described above, receiving the tuple further includes receiving a MAC CE command, the MAC CE including a configuration of the tuple. In some examples of the method, apparatus, and non-transitory computer-readable medium described above, at least one of the TCI states of the tuple corresponds to two of more of the plurality of port groups.

Some examples of the method, apparatus, and non-transitory computer-readable medium described above may further include processes, features, means, or instructions for receiving a TCI state for the first reference signal set, wherein the TCI state may indicate each of the plurality of port groups associated with the second reference signal set.

In some examples of the method, apparatus, and non-transitory computer-readable medium described above, the TCI state may include a plurality of TCI state sets, wherein the TCI state sets may correspond to different port groups of the plurality of port groups. In some examples of the method, apparatus, and non-transitory computer-readable medium described above, the plurality of TCI state sets may correspond to different reference signals of the second reference signal set. In some examples of the method, apparatus, and non-transitory computer-readable medium described above, the plurality of TCI state sets may include a TCI state set that may correspond to each of the plurality of port groups associated with a second reference signal set.

In some examples of the method, apparatus, and non-transitory computer-readable medium described above, receiving the message from the base station including the indication of the QCL relationship further may include receiving a first indication of a first QCL relationship between a first subset of the first reference signal set and a first subset of the plurality of port groups. Some examples of the method, apparatus, and non-transitory computer-readable medium described above may further include processes, features, means, or instructions for receiving, a second indication of a second QCL relationship between a second subset of the first reference signal set and a second subset of the plurality of port groups.

In some examples of the method, apparatus, and non-transitory computer-readable medium described above, the first reference signal set may include a synchronization signal block (SSB) set, a tracking reference signal (TRS) set, or a CSI-RS. In some examples of the method, apparatus, and non-transitory computer-readable medium described above, the second reference signal set may include a DM-RS of a physical downlink shared channel (PDSCH), a DM-RS of a physical downlink control channel (PDCCH), or a CSI-RS reference set. In some examples of the method, apparatus, and non-transitory computer-readable medium described above, the one or more port groups of the first reference signal set may be associated with a first downlink control information (DCI) field, and the plurality of port groups associated with the second reference signal set may be associated with a second DCI field. In some examples of the method, apparatus, and non-transitory computer-readable medium described above, the first DCI field may be associated with a first TCI state of the one or more port groups of the first reference signal set, and the second DCI field may be associated with a second TCI state of the plurality of port groups. In some examples of the method, apparatus, and non-transitory computer-readable medium described above, the message may be included in DCI or a RRC message based at least in part on the second reference signal set.

DETAILED DESCRIPTION

Figure 1:
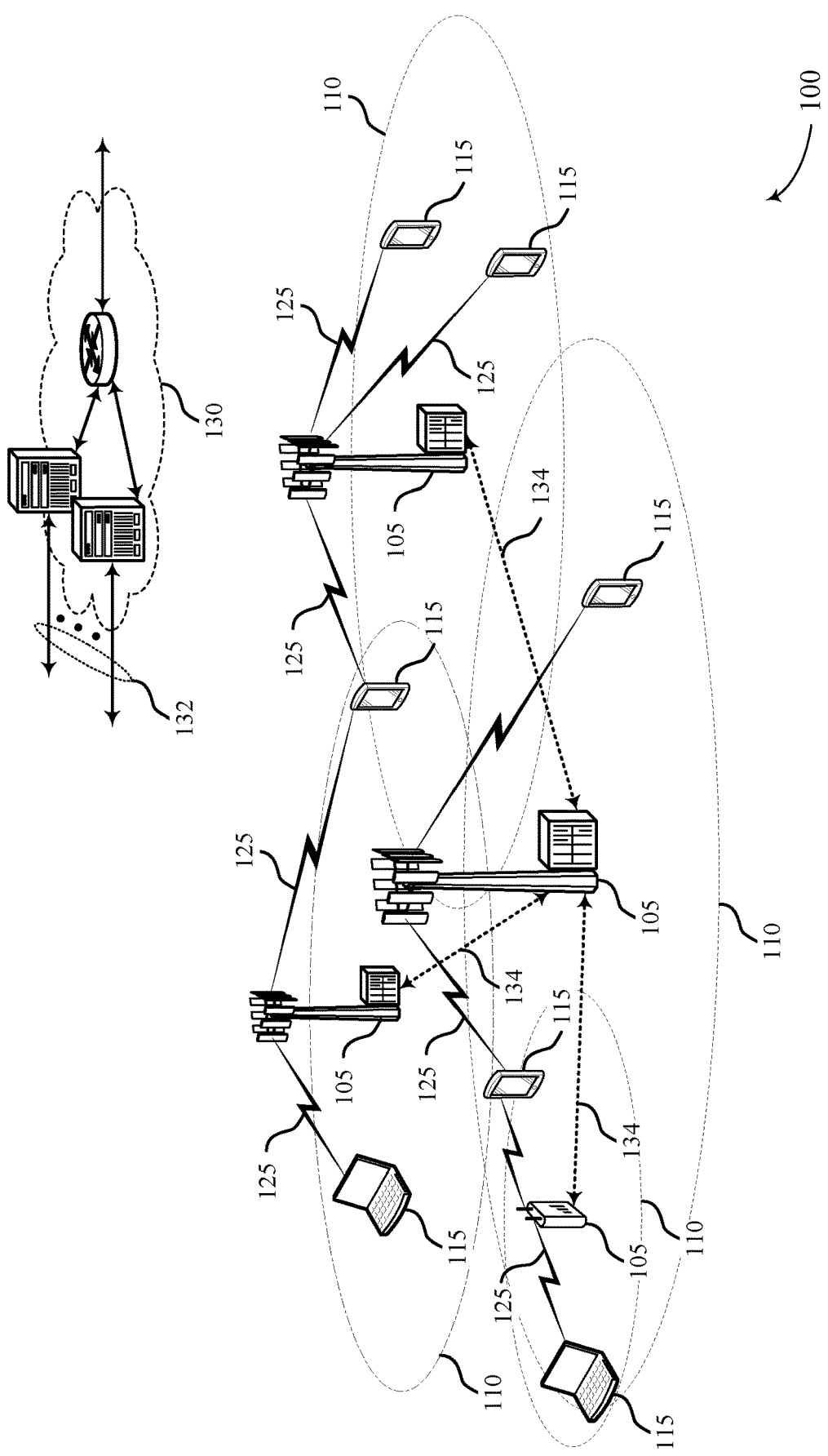
FIG. 1 illustrates an example of a system for wireless communication that supports transmission configuration indication (TCI) states indicating quasi-collocation (QCL) groups in accordance with aspects of the present disclosure.

In some wireless communications systems, a base station may communicate with a user equipment (UE) using multiple antennas. For example, a base station may transmit parallel data streams over respective antennas in order to increase throughput (e.g., as opposed to transmitting the data streams sequentially over the same antenna). Additionally, or alternatively, a base station may transmit a given data stream over multiple antennas simultaneously (e.g., to increase the diversity of the transmissions). In some cases, the use of multiple antennas may be based on the use of one or more antenna ports. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission).

Some antenna ports may be referred to as quasi co-located, meaning that the spatial parameters of a transmission on one antenna port may be inferred from the spatial parameters of another transmission on a different antenna port. Accordingly, a receiving device (e.g., a UE) may be able to perform channel estimation for demodulating data or control information received on a first set of antenna ports based on reference signals received on a second set of antenna ports that are quasi co-located with the first set of antenna ports. Thus, a quasi-collocation (QCL) relationship between antenna ports may improve the chances that a UE may be able to successfully decode a downlink transmission from a base station. In some cases, it may be appropriate for a base station to transmit, to a UE, an indication of which antenna ports are quasi co-located such that the UE may be able to identify additional reference signals to use for channel estimation.

In some aspects, a base station may configure a set of transmission configuration indication (TCI)-states to use to indicate, to a UE, QCL relationships between antenna ports used for transmitting downlink signals to the UE. Each TCI-state may be associated with a set of reference signals (e.g., synchronization signal blocks (SSBs) or different types of channel state information reference signals (CSI-RSs)), and the TCI-state may indicate a QCL relationship between antenna ports used to transmit these reference signals and antenna ports used to transmit data or control information to a UE. As such, when a UE receives an indication of a particular TCI-state from a base station (e.g., in downlink control information (DCI), in a radio resource control (RRC) message, etc.) the UE may identify that antenna ports used to transmit the reference signals associated with the TCI-state are quasi co-located with antenna ports used to transmit data and control information to the UE. Thus, the UE may use the reference signals associated with the TCI-state to perform channel estimation for demodulating data or control information (e.g., target reference signals) received from the base station.

A base station may use RRC signaling, media access control (MAC) control element (CE) (MAC-CE) signaling, or physical downlink control channel (PDCCH) signaling to configure a UE with M (e.g., 8, 64, etc.) TCI-states corresponding to different QCL relationships between antenna ports used for downlink communication with the UE. For example, the base station may use an N-bit indicator (e.g., a 3-bit indicator) to indicate a TCI-state to the UE (e.g., where $M \geq 2^N$). Each configured TCI-state may include a reference signal set and may include parameters for configuring QCL relationship between the reference signals (e.g., reference signal resources) in the reference signal set and a second reference signal (e.g., a demodulation reference signal (DM-RS)) port group.

However, in some cases, a UE may use different port configurations for receiving signals (e.g., for DM-RS), which may alter QCL relationships with a reference signal resource (e.g., as different port configuration may be associated with different spatial parameters). For example, DM-RS may be configured per port group (e.g., Type 1 DM-RS may utilize up to 8 ports, Type 2 DM-RS may utilize up to 12 ports, etc.). For Type 1 DRMS, for example, the 8 ports may be grouped based on different total radiated power (TRP) associated with the different groups. For example, ports 1-4 may be associated with a first TRP and ports 5-8 may be associated with a second TRP. In such cases, it may be desirable to track the port groups separately, as the different port groups may be associated with different timing, Doppler spreads, etc. These DM-RS port groups may therefore be associated with different QCL-Types. As such, a reference signal resource (e.g., associated with a TCI-state) may have different QCL groups (e.g., different QCL relationships with the different port groups). CSI-RS resources may also have multiple QCL groups. In cases where a UE may use different port configurations (e.g., port groups) for receiving signals (e.g., where a reference signal resource may have more than one QCL group), improved TCI-state signaling may be desired.

The techniques described herein provide for signaling different QCL relationships to different QCL groups of the same reference signal resource. That is, QCL groups, or QCL relationships between port groups for target reference signals, corresponding to one or more port groups of a reference signal resource may be signaled. For example, a base station may configure a tuple of TCI-states, where each TCI-state of the tuple corresponds to a QCL group of target reference signals (e.g., a TCI-state-i may correspond to a DM-RS-port-group-i). In other examples, TCI-states may be configured with TCI-state-sets (e.g., per-QCL-group association) at the RRC level. Each TCI-state may indicate or be associated with a target resource identification (ID) with port-group ID and one or more reference resource IDs with port-group ID (e.g., one or more TCI-state-sets). TCI-states may thus include TCI-state-sets that indicate QCL groups for any port groups associated with the target reference signal. In yet other examples, a TCI-state indication (e.g., a MAC CE, DCI, etc.) may be extended to indicate multiple TCI-states for different QCL groups. For example, where two DM-RS fields may be introduced, each DM-RS field may be associated with one DM-RS port group. Whenever the UE is semi-statically configured with two DM-RS port groups, there may be two DCI fields in the downlink DCI, where each DCI field signals the TCI-state of the corresponding DM-RS port group. These techniques, as described in more detail below, may provide for TCI-states that include indication of any QCL groups (e.g., QCL relationships associated with different port groups) that may be associated with a reference signal resource.

Aspects of the disclosure are initially described in the context of a wireless communications system. Example process flows for implementation of TCI-states indicating QCL groups are then described. Aspects of the disclosure are further illustrated by and described with reference to apparatus diagrams, system diagrams, and flowcharts that relate to TCI-states indicating QCL groups.

FIG. 1 illustrates an example of a wireless communications system 100 that supports TCI-states indicating QCL groups in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support multiple-input multiple-output (MIMO) operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may insert periodic pilot symbols such as a cell-specific reference signal (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block (RB) based on the number of antenna ports or layers (up to 4) of the receiving UEs 115. In addition to CRS, which may be utilized by all UEs 115 in the coverage area 110 of the base station 105, DM-RS may be directed toward specific UEs 115 and may be transmitted only on RBs assigned to those UEs 115. DM-RS may include signals on 6 resource elements in each RB in which they are transmitted. The DM-RS for different antenna ports may each utilize the same 6 resource elements, and may be distinguished using different orthogonal cover codes (e.g., masking each signal with a different combination of 1 or −1 in different resource elements). In some cases, two sets of DM-RS may be transmitted in adjoining resource elements. In some cases, additional reference signals known as CSI-RS may be included to aid in generating channel state information (CSI). On the uplink, a UE 115 may transmit a combination of periodic sounding reference signal (SRS) and uplink DM-RS for link adaptation and demodulation, respectively.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, an SFN, and a physical HARQ indicator channel (PHICH) configuration. After decoding the MIB, the UE 115 may receive one or more Ms. For example, SIB1 may contain cell access parameters and scheduling information for other SIB s. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, SRS, and cell barring. In some cases, a base station 105 may transmit synchronization signals (SSs) (e.g., PSS SSS, and the like) using multiple beams in a beam-sweeping manner through a cell coverage area. For example, PSS, SSS, and/or broadcast information (e.g., a PBCH) may be transmitted within different SS blocks on respective directional beams, where one or more SS blocks may be included within an SS burst. In some cases, these SSs and RSs may be transmitted at different times and/or using different beams.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Different spatial layers may be associated with different antenna ports used for channel measurement and reporting. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission). In some cases, some antenna ports may be referred to as quasi co-located, meaning that the spatial parameters associated with a transmission on one antenna port may be inferred from the spatial parameters associated with another transmission on a different antenna port.

Accordingly, if a first set of antenna ports is quasi co-located with a second set of antenna ports, a UE 115 may be able to perform channel estimation for demodulating data or control information received on the first set of antenna ports based on reference signals received on the second set of antenna ports. For example, the UE 115 may be able to determine a delay spread, a Doppler shift, etc. associated with a downlink transmission of data or control information on the first set of antenna ports based on the reference signals received on the second set of antenna ports. The UE 115 may then use a channel estimate (i.e., determined based on performing channel estimation as described above) to correctly decode a downlink transmission from a base station 105. Thus, a QCL relationship between antenna ports used for downlink communications between a base station 105 and a UE 115 may improve the chances that the UE 115 may be able to successfully decode a downlink transmission from the base station 105. As such, it may be appropriate for a base station to transmit, to a UE, an indication of which antenna ports are quasi co-located such that the UE may be able to identify additional reference signals to use for channel estimation.

In wireless communications system 100, a base station 105 may configure a set of TCI-states that correspond to different QCL relationships between antenna ports used for communication with a UE 115. A TCI-state may be associated with a set of reference signals (e.g., SSBs or different types of CSI-RSs), and the TCI-state may indicate a QCL relationship between antenna ports used to transmit these reference signals and antenna ports used to transmit data or control information to a UE 115. As such, when a UE 115 receives an indication of a particular TCI-state from a base station 105 (e.g., in DCI, RRC message, etc.), the UE 115 may identify that antenna ports used to transmit the reference signals associated with the TCI-state are quasi co-located with antenna ports used to transmit data and control information to the UE 115. Thus, the UE 115 may use the reference signals associated with the TCI-state to perform channel estimation for demodulating data or control information received from the base station 105. For example, the UE 115 may determine a delay spread, Doppler shift, etc. associated with a transmission of data or control information based on the reference signals associated with the TCI-state.

Each configured TCI-state may include a reference signal set and may include parameters for configuring QCL relationship between the reference signals in the reference signal set and a second reference signal (e.g., a DM-RS) port group. However, a reference signal resource may have more than one QCL group (e.g., QCL type or QCL relationship with different antenna ports). For example, a DM-RS may have two DM-RS port groups, and each port group may be associated with a different QCL group. CSI-RS resources may also have multiple QCL groups. Base stations 105 may signal different QCL association (e.g., a QCL relationship) for different QCL groups of the same reference signal resource. That is, QCL groups, or QCL associations between port groups for target reference signals, corresponding to a reference signal resource may be signaled to a UE 115 for channel estimation for demodulating data or control information received from the base station 105. Target reference signals may include reference signals such as physical downlink shared channel (PDSCH) DM-RS, PUSCH DM-RS, CSI-RS, TRS, SRS, etc.

Figure 2:
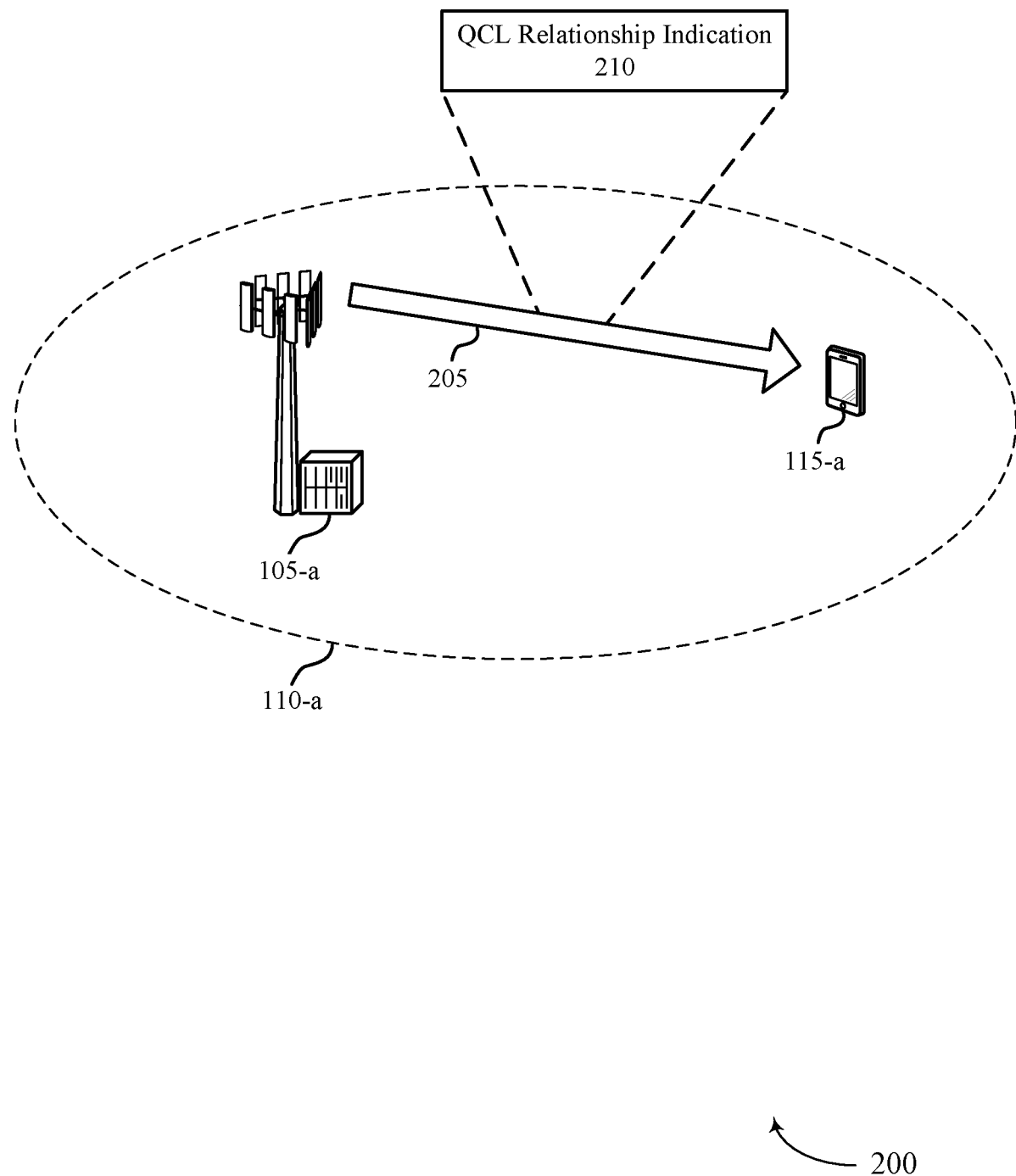
FIG. 2 illustrates an example of a wireless communications system that supports TCI-states indicating QCL groups in accordance with aspects of the present disclosure.

FIG. 2 illustrates an example of a wireless communications system 200 that supports TCI-states indicating QCL groups in accordance with aspects of the present disclosure. In some examples, wireless communications system 200 may implement aspects of wireless communications system 100. For example, wireless communications system 200 may include a base station 105-*a* and a UE 115-*a*, which may be example of the corresponding devices as described with reference to FIG. 1. In wireless communications system 200, base station 105-*a* may transmit QCL relationship indications 210 to UE 115-*a* via downlink 205 (e.g., DCI, downlink RRC signaling, etc.).

As described with reference to FIG. 1, base station 105-*a* may configure a set of TCI-states that correspond to both different QCL relationships between antenna ports used for downlink communications with a UE 115-*a* and different QCL relationships between one or more port groups of a reference signal resource and port groups of a target reference signal. Base station 105-*a* may then use these TCI-states to indicate, to UE 115-*a*, different QCL relationships between antenna ports and antenna port configurations used for downlink communications with UE 115-*a*. For example, base station 105-*a* may transmit an indication that a first set of antenna ports used to transmit periodic CSI-RSs to UE 115-*a* are quasi co-located with a second set of antenna ports used to transmit data to the UE 115-*a*. Accordingly, UE 115-*a* may perform channel estimation for demodulating the data received on the second set of antenna ports using the CSI-RSs received on the first set of antenna ports (e.g., in addition to DM-RSs received on the second set of antenna ports).

For example, UE 115-*a* may be configured with up to M TCI-states via higher layer signaling, and may decode PDSCH according to detected PDCCH with DCI (e.g., based on a QCL relationship indicated by a TCI-state in the DCI). Each configured TCI-state may include one reference signal set (e.g., TCI-RS-SetConfig). Each TCI-RS-SetConfig may include parameters for configuring QCL relationships between the reference signals in the reference signal set and the DM-RS port group of the PDSCH. That is, a TCI-state may be associated with a reference signal set, and the reference signal set may include reference signals that point to different QCL types (e.g., different QCL-Types as discussed below with reference to Table 2.1). In some cases, the reference signal set may include a reference to either one or two downlink reference signals and an associated QCL-type for each one configured by the higher layer parameter QCL-Type. In cases where there are two downlink reference signals, the QCL types may, in some cases, not be the same, regardless of whether the references are to the same downlink reference signal or different downlink reference signals.

Base station 105-*a* may indicate QCL types to UE 115-*a* based on a higher layer parameter QCL-Type. QCL-Type may take one or a combination of the following types shown in Table 2.1.

TABLE 2.1

| | |
|---|---|
| QCL-TypeA | {Doppler shift, Doppler spread, average delay, delay spread} |
| QCL-TypeB | {Doppler shift, Doppler spread} |
| QCL-TypeC | {average delay, Doppler shift} |
| QCL-TypeD | {Spatial Receive (Rx) Parameter} |

For further illustration, Table 2.2 shows example QCL associations and corresponding QCL-Type signaling.

TABLE 2.2

| QCL linkage for below 6 GHz after RRC | Signaling |
|---|---|
| SSB → TRS: Doppler shift, average delay | QCL-TypeC |
| TRS → CSI-RS for CSI acquisition: Doppler shift, Doppler spread, average delay, delay spread | QCL-TypeA |
| TRS → DM-RS: Doppler shift, Doppler spread, average delay, delay spread | QCL-TypeA |
| TRS → CSI-RS for CSI acquisition: Doppler shift, Doppler spread | QCL-TypeB |
| CSI-RS → DM-RS: Doppler shift, Doppler spread, average delay, delay spread | QCL-TypeA |

For a reference signal set associated with a TCI-state, two QCL-Types may be configured (e.g., a QCL-Type for two references signals of the reference signal set). For example, a TCI-state may indicate a CSI-RS has a QCL-TypeA relationship and a TRS has a QCL-TypeA relationship. TCI-states may be indicated by base station 105-*a*, for example, using a MAC CE which may include N-bits (e.g., a 3-bit indicator) to indicate some TCI-state (e.g., of M TCI-states) to the UE 115-*a* (e.g., where $M \geq 2^N$).

For example, base station 105-*a* may use PDCCH to indicate a TCI-state to UE 115-*a*. UE 115-*a* may decode the PDCCH and, based on the TCI-state, identify a QCL relationship (e.g., based on QCL-Types indicated by the TCI-state) to determine a delay spread, Doppler shift, etc. that should be used to receive PDSCH DM-RS.

In some cases, a reference signal resource may have more QCL group (e.g., a reference signal resource may have a QCL-TypeA relationship with a first DM-RS port group and a QCL-TypeB relationship with a second DM-RS port group). For example, DM-RS may be configured per port group. Type 1 DM-RS may utilize up to 8 ports, Type 2 DM-RS may utilize up to 12 ports, etc. For Type 1 DRMS, for example, the 8 ports may be grouped based on different total radiated power (TRP) associated with the different groups. For example, ports 1-4 may be associated with a first TRP and ports 5-8 may be associated with a second TRP. In such cases, it may be desirable to track the port groups separately, as the different port groups may be associated with different timing, Doppler spreads, etc. These DM-RS port groups may therefore be associated with different QCL-Types.

As reference signal resources (e.g., SSB resources, TRS resources, CSI-RS resources, etc.) may have more than one QCL groups for different target reference signal port groups (e.g., for two different DM-RS port groups) the following techniques may provide beneficial TCI-state improvements for QCL association for different QCL groups of the same reference signal resource. That is, QCL relationship indication 210 may include improved TCI-states indicating QCL groups. For example, QCL relationship indication 210 may include a tuple of TCI-states, where each TCI-state of the tuple corresponds to a QCL group of target reference signals (e.g., a TCI-state-i may correspond to a DM-RS-port-group-i). In other examples, QCL relationship indication 210 may include TCI-state-sets with per-QCL-group association (e.g., each TCI-state may indicate a target resource ID with port-group ID and one or more reference signal resource IDs with port-group ID). In yet other examples (e.g., where two DM-RS fields/port groups are introduced), downlink 205 may include two DCI fields, and QCL relationship indication 210 may refer to two TCI-states of the corresponding DM-RS port groups (e.g., the two TCI-states included in the two DCI fields).

Tuples of TCI-states may be configured by a network. For example, base station 105-a may configure tuples of TCI-states (e.g., QCL relationship indications 210) through MAC CE for PDSCH/PUSCH DM-RS QCL relationships. Tuples may include at least two TCI-states. In some cases (e.g., with the MAC CE command), each codepoint of the DCI field (e.g., of downlink 205) may be associated with a tuple of TCI-states (e.g., TCI-state-1, TCI-state-2, TCI-state-N), where N is the number of QCL groups in the DM-RS PDSCH/PDCCH. Therefore, the MAC CE command may map the N-bit indicator to tuples of TCI-states for QCL group indication. Upon receiving a tuple of TCI-states UE 115-a may determine QCL parameters for different QCL groups. For example, when UE 115-a uses two port configurations for DM-RS (e.g., Type 1 DM-RS), the UE 115-a may determine QCL parameters for the first port group (e.g., ports 1-4) of the DM-RS from the first element (e.g., first TCI-state) of the tuple, and may determine QCL parameters for the second port group (e.g., ports 5-8) of the DM-RS from the second element (e.g., second TCI-state) of the tuple. Any state of the tuple of (TCI-state-1, TCI-state-2) may originate from a common pool of TCI-states configured at the RRC level (e.g., tuples may be preconfigured, such that the N-bit indicator may be used). In cases where multiple TCI-states are associated through MAC CE with a DCI codepoint, and the UE 115-a has been RRC-configured with two DM-RS port groups, the UE 115-a may assume that this TCI-state (e.g., tuple) is associated with both DM-RS port groups. If multiple TCI-states are associated through MAC CE with a DCI codepoint, TCI-state-i may correspond to DM-RS-port-group-i (e.g., the sequence may be specified, or configured through RRC).

In some examples, QCL relationship indication 210 may include TCI-state-sets (e.g., QCL grouping within TCI-states) configured at the RRC level. For example, each TCI-state may include QCL groups, where each QCL group include parameters for configuring QCL relationships between one or more port groups of the reference signal resource in the reference signal set and a second reference signal set associated with, for example, a port group. That is, TCI-states may, by analogy, effectively include two or more TCI-states (e.g., one TCI-state-set for each QCL group) via additional parameter configuration in RRC signaling. The RRC framework may be enhanced such that each TCI-state includes an association between a target resource ID with port-group-id (e.g., if multiple groups exist in this resource) and one or more reference signal resource ID with port-group-id (e.g., if multiple groups exist in this resource). One example of such a configuration may include:

```
TCI-RS-Set ::=
    QCL-group-1
    tci-RS-SetID              TCI-RS-SetID,
    qcl-Type1                 SEQUENCE {
        referenceSignal           CHOICE {
            csi-rs                    NZP-CSI-RS-ResourceConfigID,
            ssb                       SSB-Id,
            trs                       CSI-ResourceSetID
        },
        qcl-Type                  ENUMERATED {typeA, typeB, typeC, typeD}
    },
    qcl-Type2                 SEQUENCE {
        referenceSignal           CHOICE {
            csi-rs                    NZP-CSI-RS-ResourceConfigID,
            ssb                       SSB-Id,
            trs                       CSI-ResourceSetID
        },
        qcl-Type                  ENUMERATED {typeA, typeB, typeC, typeD}
    },
    QCL-group-2
    tci-RS-SetID              TCI-RS-SetID,
    qcl-Type1                 SEQUENCE {
        referenceSignal           CHOICE {
            csi-rs                    NZP-CSI-RS-ResourceConfigID,
            ssb                       SSB-Id,
            trs                       CSI-ResourceSetID
        },
        qcl-Type                  ENUMERATED {typeA, typeB, typeC, typeD}
    },
    qcl-Type2                 SEQUENCE {
        referenceSignal           CHOICE {
            csi-rs                    NZP-CSI-RS-ResourceConfigID,
            ssb                       SSB-Id,
            trs                       CSI-ResourceSetID
```

| | |
|---|---|
| },| |
| qcl-Type | ENUMERATED {typeA, typeB, typeC, typeD} |
| }, | |

TCI-state-sets (e.g., QCL-group-1 and QCL-group-2) may be collections of TCI-states of the same target resource ID, but with different port group IDs (e.g., QCL-group-1 and QCL-group-2 in the example configuration above may be associated with different port group IDs). To dynamically signal TCI-states for a target reference signal (e.g., DM-RS), each DCI codepoint may signal one TCI-state-set. Similarly, to semi-statically signal TCI-states (e.g., CSI-RS), each CSI-RS resource may be associated with a TCI-state-set. If the signaled TCI-state-set includes one TCI-state, and the target reference signal has multiple groups, then this TCI-state may apply to all groups of that set (e.g., the UE 115-a may not expect to be signaled TCI-state-set which includes N TCI-states, and the target resource contains M multiple groups, where N<M, unless N=1.

In yet other examples, QCL relationship indication 210 may include two TCI-states conveyed via two DCI fields. For example, the N-bit indicator may be extended (e.g., a 3-bit indicator may be extended to a 6-bit indicator) such that the first set of bits (e.g., the first 3 bits of the 6-bit indicator) points to a TCI-state for a first QCL group and the second set of bits (e.g., the last 3 bits of the 6-bit indicator) points to a TCI-state for a second QCL group. That is, MAC CE mapping may be analogous to the mapping described above, however the N-bit indicator may be extended (e.g., more DCI bits) to instead convey one or more TCI-states for one or more QCL groups (e.g., one or more port groups). For example, in cases where UE 115-a uses two DM-RS port groups, QCL relationship indication 210 may include an extended indicator (e.g., two DCI fields) that indicates two TCI-states of the corresponding DM-RS port groups (e.g., a first DCI field may indicate TCI-state1 for DM-RS ports 1-4, and a second DCI may indicate TCI-state2 for DM-RS ports 5-8). In such a scenario, if the DCI does not include two DCI fields for TCI-state indication, but the UE 115-a has two DM-RS port groups, the UE 115-a may assume that the two DM-RS port groups are associated with the one DCI field transmitted by the base station 105-a.

In some cases, the MAC CE may depend on UE capability (e.g., a MAC CE signaled by base station 105-a may depend on UE 115-a capabilities). For example, base station 105-a may apply or utilize a larger MAC CE payload (e.g., indicating mapping from multiple TCI-states to N bit DCI) for UEs supporting multiple DM-RS port groups simultaneously. If UE 115-a supports k port groups, base station 105-a may use a larger MAC CE payload to indicate mapping from multiple TCI-states to (k*N)-bit DCI (e.g., where a TCI-state may be indicated every N bits for each of the k port groups). In other cases (e.g., when a UE does not support such a higher capability of multiple port groups, base station 105-a may use the N-bit DCI to indicate the single TCI-state. In some cases, UEs 115 may be capable of supporting multiple port groups, but may operate in a rank-restriction mode for a window of time, such that they behave like UEs that do not have multiple port group capability. For example, the extra receive chains that usually give them the higher capability (e.g., to support multiple port groups) may be busy or occupied (e.g., for inter-frequency measurements during the rank-restriction window). In such cases, base station 105-a may use the N-bit DCI to indicate the single TCI-state while the UE is operating in such a rank-restriction mode.

It should be understood that the techniques described above for QCL relationship indication, RRC configuration of TCI-state-sets, TCI-state tuple configuration, etc. may be applied to other QCL scenarios by analogy, without departing from the scope of the present disclosure. For example, techniques discussed may be extended to wireless devices supporting any number of k port groups (e.g., tuples of TCI-states may include k-tuples or tuples including k TCI-states, TCI-states may include k TCI-state-sets, k DCI fields or (k*N)-bit MAC CE indicators may be implemented, etc. using analogous techniques to those described above. Further, these techniques may be applied to different configurations or groupings of antenna ports for reference signals, different target reference signal measurements such as PUSCH DM-RS, CSI-RS, TRS, SRS, target data, etc.

Figure 3:
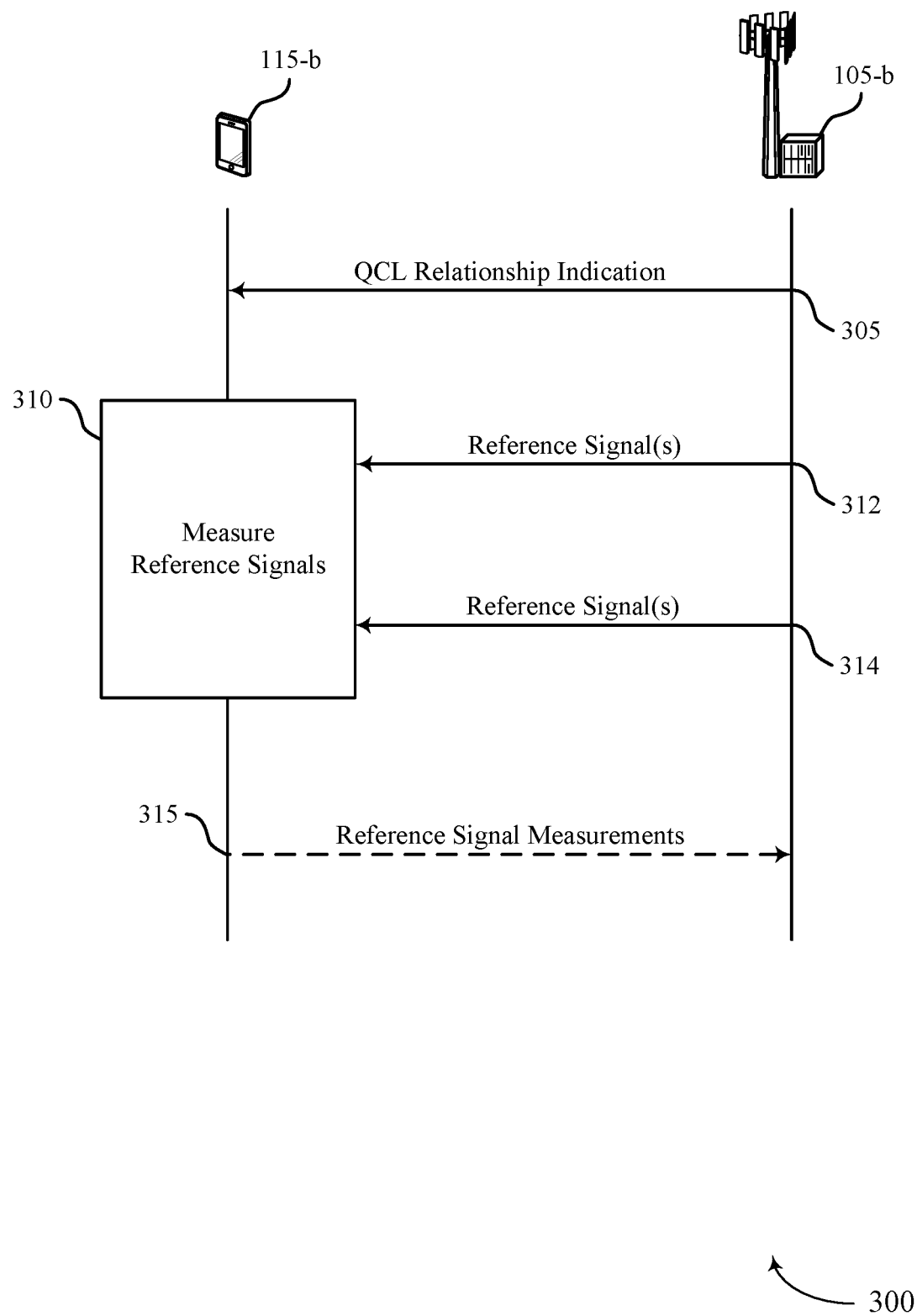
FIG. 3 illustrates an example of a process flow that supports TCI-states indicating QCL groups in accordance with aspects of the present disclosure.

FIG. 3 illustrates an example of a process flow 300 that supports TCI-states indicating QCL groups in accordance with aspects of the present disclosure. In some examples, process flow 300 may implement aspects of wireless communications system 100. Process flow 300 may include a base station 105-b and a UE 115-b, which may be example of the corresponding devices as described with reference to FIGS. 1 and 2. In process flow 300, base station 105-b may indicate QCL relationships, for one or more QCL groups, to UE 115-b.

At 305, base station 105-b may transmit a QCL relationship indication to UE 115-b. The QCL relationship indication may include a tuple of TCI-states, TCI-states with TCI-state-sets, or two TCI-states indicated via an extended MAC CE indicator/two DCI fields. The QCL relationship indication may refer to a message, transmitted by base station 105-b over a wireless channel, that includes an indication of a QCL relationship between one or more port groups of a first reference signal set and a plurality of port groups associated with a second reference signal set. For example, the message (e.g., the QCL relationship indication) may indicate two QCL groups, where each QCL group includes a QCL relationship between the first reference signal set (e.g., a reference signal resource) and a port group associated with the second reference signal set (e.g., a port group associated with a target reference signal).

For example, UE 115-a may receive a tuple of TCI-states for the first reference signal set, wherein each TCI-state of the tuple indicates (e.g., a QCL relationship for) one of the plurality of port groups associated with the second reference signal set (e.g., of the PDSCH). The first TCI-state of the tuple may correspond to a first port group of the plurality of port groups and the second TCI-state of the tuple corresponds to a second port group of the plurality of port groups. In some cases, a sequence indicating the correspondence may be received via RRC messaging. In some cases, the tuple may be configured via a MAC CE (e.g., using some N-bit indicator).

In some cases, a single TCI-state may indicate (e.g., correspond to) each of the plurality of port groups associated with the second reference signal set. In some cases, the TCI-state may include multiple TCI-state-sets, and each TCI-state-set may correspond to different port groups the second set of reference signals. In some cases, the plurality of TCI-state sets correspond to different reference signals of the reference signal set, or different port groups associated with a reference signal in the reference signal set.

In some cases, the message may be received (e.g., by UE 115-*b*) in DCI of PDCCH (e.g., when the target reference signal is the PDSCH). In other cases, the message may be received in an RRC message (e.g., when the target reference signal is CSI-RS).

At 310, UE 115-*b* may obtain reference signal measurements for reference signals associated with the reference signal port groups based at least in part on the indicated QCL relationship. For example, base station 105-*b* may transmit one or more reference signals of the first reference signal set at 312, and may transmit one or more reference signals of the second reference signal set at 314, which may be obtained by the UE 115-*b*. At 314, the UE 115-*b* may be able to perform channel estimation for demodulating the one or more reference signals of the second reference signal set at 314 on a set of antenna ports based on QCL relationships (e.g., indicated at 305) with reference signals received at 312. The first reference signal set may include a SSB set, a TRS set, a CSI-RS, etc. The second reference signal set may include a DM-RS reference set, a CSI-RS reference set, etc.

At 315, UE 115-*b* may optionally transmit the reference signal measurements obtained at 310 to the base station 105-*b* (e.g., over the wireless channel). In some cases, UE 115-*b* may initially receive (e.g., via a RRC message, MAC CE command, etc.), or be configured with, a common pool of TCI-states. In other cases, UE 115-*b* may just process the reference signal measurements obtained at 310 according to the QCL relationship indication received at 305.

Figure 4:
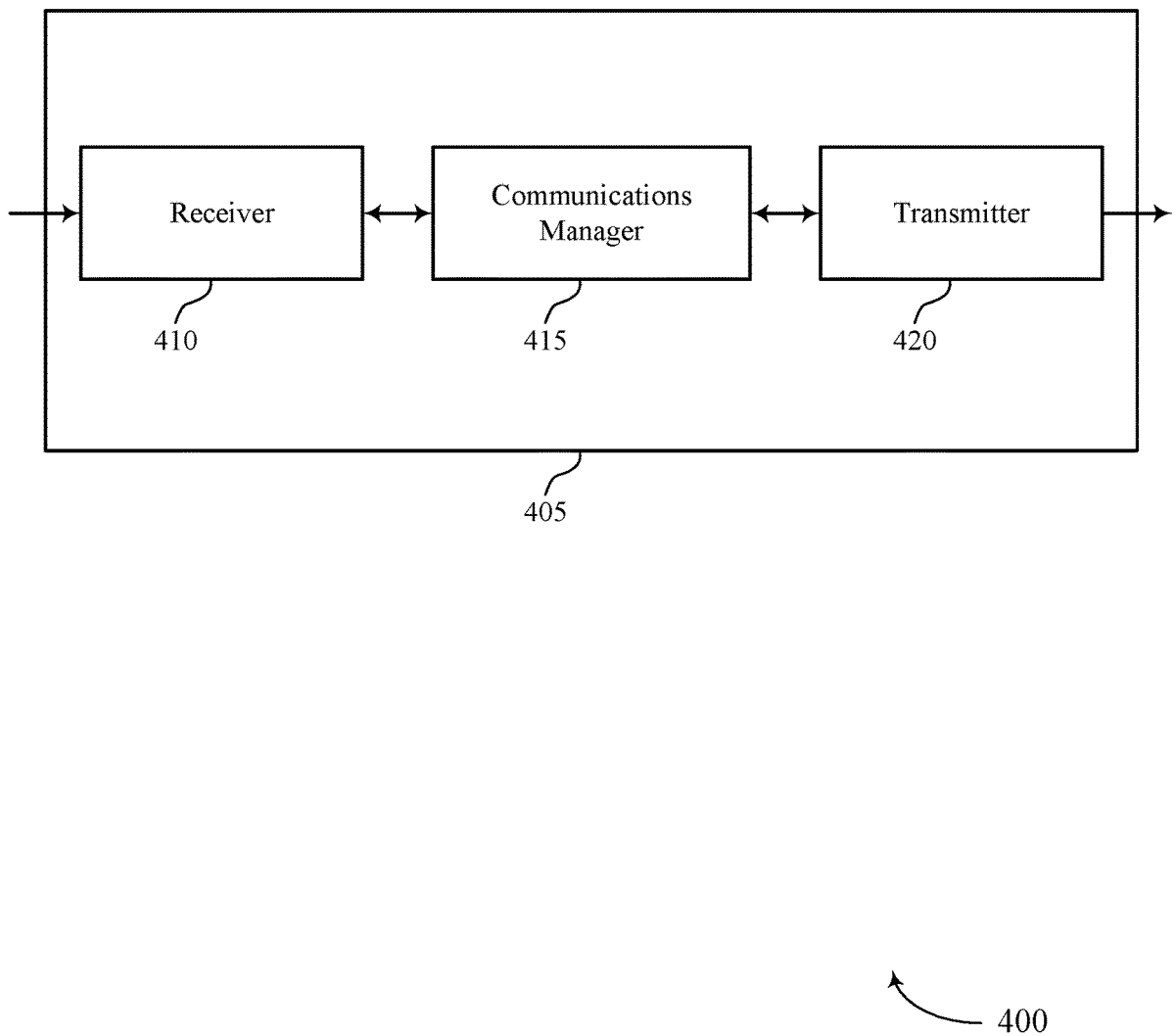
FIGS. 4 through 6 show block diagrams of a device that supports TCI-states indicating QCL groups in accordance with aspects of the present disclosure.

FIG. 4 shows a block diagram 400 of a UE 405 that supports TCI-states indicating QCL groups in accordance with aspects of the present disclosure. UE 405 may be an example of aspects of a UE 115 as described herein. UE 405 may include receiver 410, communications manager 415, and transmitter 420. UE 405 may also include a processor. Each of these components may be in communication with one another (e.g., via one or more buses).

Receiver 410 may receive information such as packets, user data, or control information associated with various information channels (e.g., control channels, data channels, and information related to TCI-states indicating QCL groups, etc.). Information may be passed on to other components of the device. The receiver 410 may be an example of aspects of the transceiver 720 described with reference to FIG. 7. The receiver 410 may utilize a single antenna or a set of antennas.

Communications manager 415 may be an example of aspects of the communications manager 710 described with reference to FIG. 7. Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 415 may receive, over a wireless channel, a message from a base station including an indication of a QCL relationship between a first reference signal set and a set of port groups associated with a second reference signal set. Communications manager 415 may then obtain reference signal measurements for reference signals associated with the reference signal port groups based on the indicated QCL relationship. In some cases, the second reference signal may be a DM-RS of PDSCH or PDCCH, or CSI-RS.

Transmitter 420 may transmit signals generated by other components of the device. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas. In some cases, the transmitter may transmit the reference signal measurements to the base station over the wireless channel.

Figure 5:
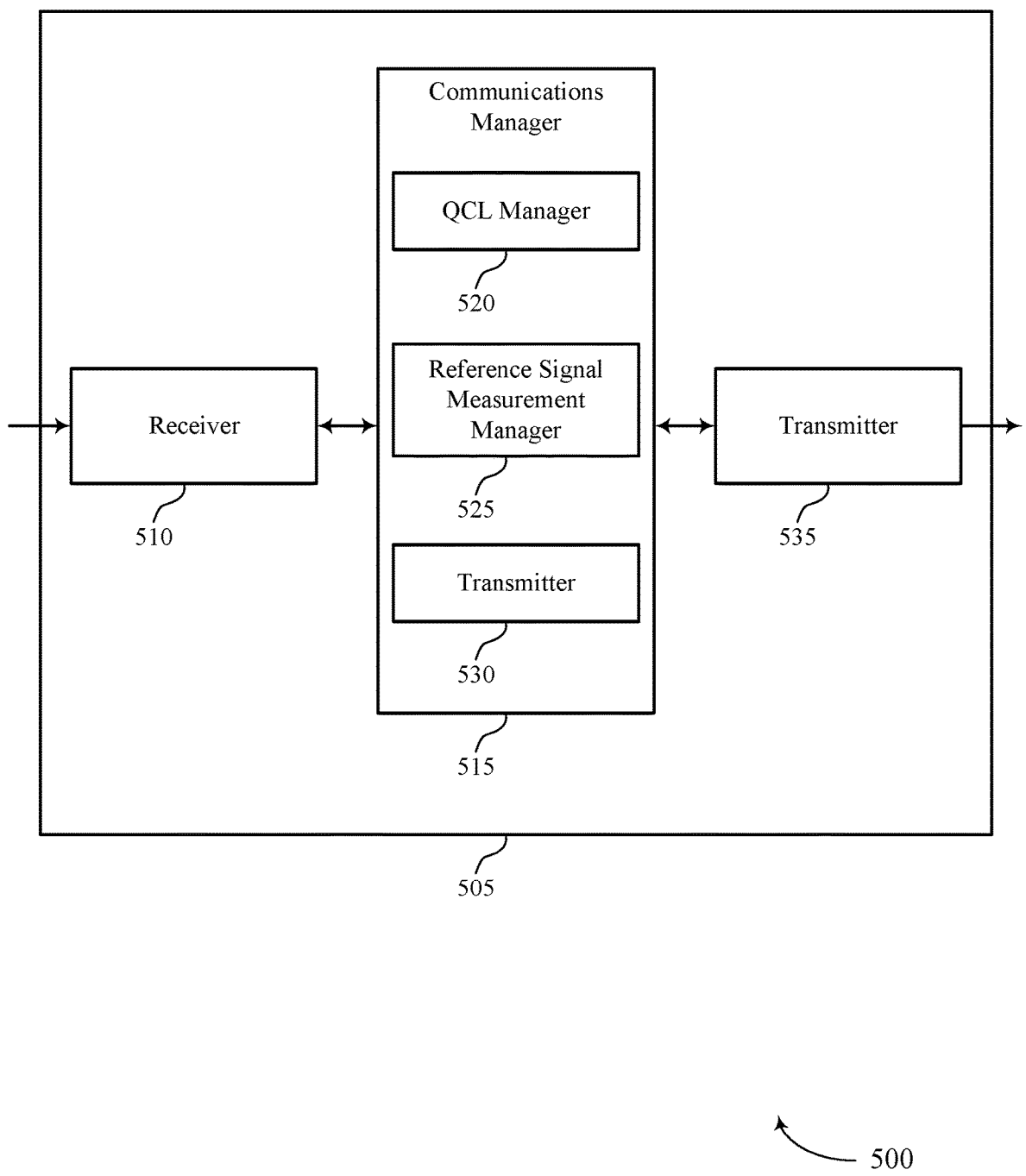

FIG. 5 shows a block diagram 500 of a UE 505 that supports TCI-states indicating QCL groups in accordance with aspects of the present disclosure. UE 505 may be an example of aspects of a UE 405 or a UE 115 as described with reference to FIGS. 1 and 405. UE 505 may include receiver 510, communications manager 515, and transmitter 535. UE 505 may also include a processor. Each of these components may be in communication with one another (e.g., via one or more buses).

Receiver 510 may receive information such as packets, user data, or control information associated with various information channels (e.g., control channels, data channels, and information related to TCI-states indicating QCL groups, etc.). Information may be passed on to other components of the device. The receiver 510 may be an example of aspects of the transceiver 720 described with reference to FIG. 7. The receiver 510 may utilize a single antenna or a set of antennas.

Communications manager 515 may be an example of aspects of the communications manager 710 described with reference to FIG. 7. Communications manager 515 may also include QCL manager 520, reference signal measurement manager 525, and transmitter 530.

QCL manager 520 may receive, over a wireless channel, a message from a base station including an indication of a QCL relationship between a first reference signal set and a set of port groups associated with a second reference signal set.

Reference signal measurement manager 525 may obtain reference signal measurements for reference signals associated with the reference signal port groups based on the indicated QCL relationship.

Transmitter 530 may transmit the reference signal measurements to the base station over the wireless channel.

Transmitter 535 may transmit signals generated by other components of the device. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
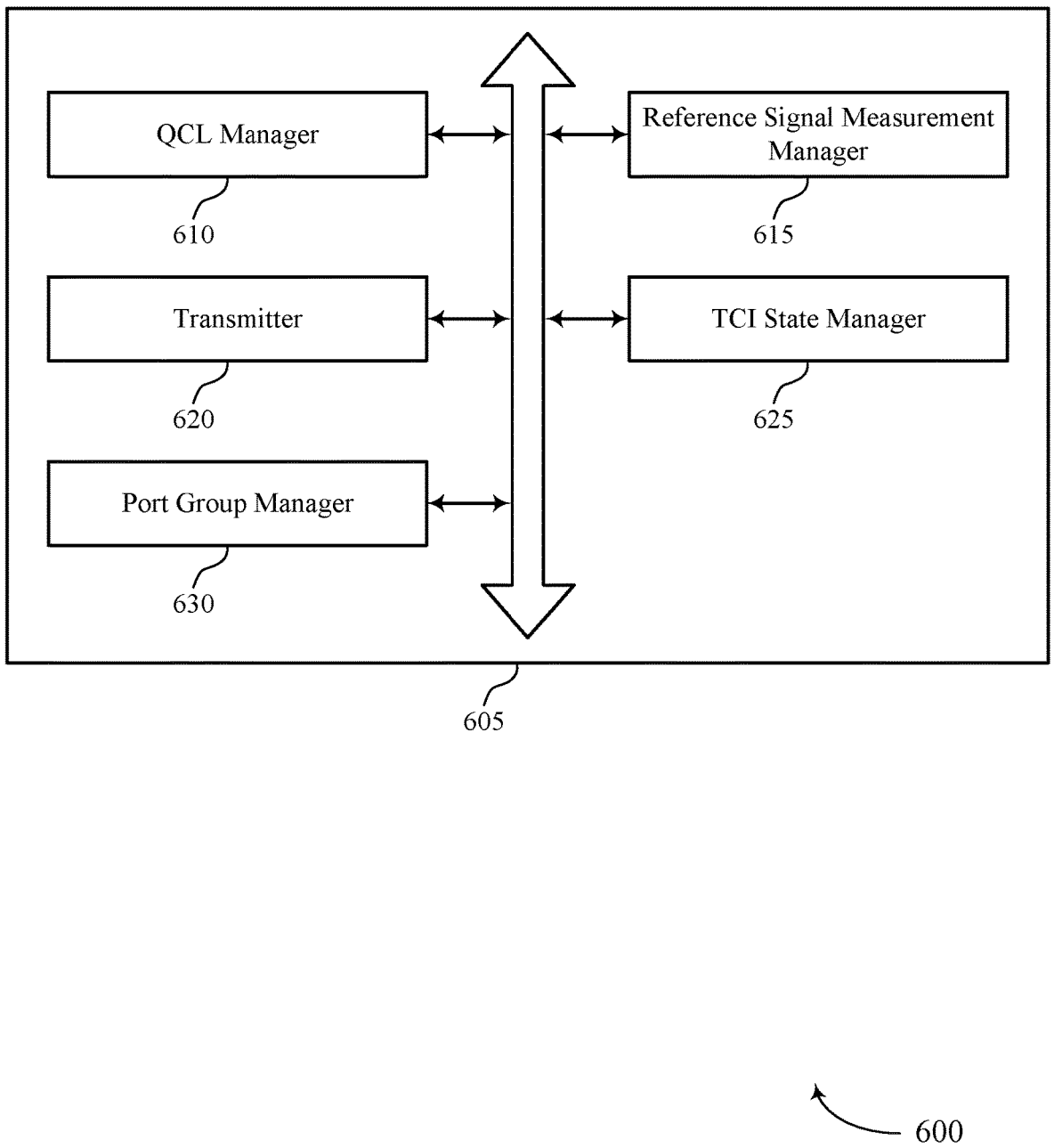

FIG. 6 shows a block diagram 600 of a communications manager 605 that supports TCI-states indicating QCL groups in accordance with aspects of the present disclosure. The communications manager 605 may be an example of aspects of a communications manager 415, a communications manager 515, or a communications manager 710 described with reference to FIGS. 4, 5, and 7. The communications manager 605 may include QCL manager 610, reference signal measurement manager 615, transmitter 620, TCI-state manager 625, and port group manager 630. Each of these modules may communicate, directly or indirectly, with one another (e.g., via one or more buses).

The QCL manager 610 may receive, over a wireless channel, a message from a base station including an indication of a QCL relationship between a first reference signal set and a set of port groups associated with a second reference signal set. In some examples, the QCL manager 610 may receive, a first indication of a first QCL relationship between a first subset of the first reference signal set and a first subset of the set of port groups. In some examples, the QCL manager 610 may receive, a second indication of a second QCL relationship between a second subset of the first reference signal set and a second subset of the set of port groups.

In some examples, the QCL manager 610 may in some cases, the message is included in DCI or a RRC message based on the second reference signal set.

The reference signal measurement manager 615 may obtain reference signal measurements for reference signals associated with the reference signal port groups based on the indicated QCL relationship. In some examples, the first reference signal set includes a SSB set, a TRS set, or a CSI-RS. In some examples, the second reference signal set includes a DM-RS reference set or a CSI-RS reference set.

The transmitter 620 may transmit the reference signal measurements to the base station over the wireless channel.

The TCI-state manager 625 may receive a tuple of TCI-states for the first reference signal set, where each TCI-state of the tuple indicates one of the set of port groups associated with the second reference signal set. In some examples, the TCI-state manager 625 may receive a RRC message indicating a common pool of TCI-states. In some examples, the TCI-state manager 625 may receive a MAC CE command, the MAC CE including a configuration of the tuple. In some cases, the RRC message includes a MAC CE command. In some cases, the TCI-state includes a set of TCI-state sets, and where the TCI-state sets correspond to different port groups of the set of port groups. In some cases, the set of TCI-state sets includes a TCI-state set that corresponds to each of the set of port groups associated with a second reference signal set.

The port group manager 630 may receive a RRC message including a sequence indicating the correspondence. In some examples, the port group manager 630 may receive a TCI-state for the first reference signal set, where the TCI-state indicates each of the set of port groups associated with the second reference signal set. In some examples, the port group manager 630 may in some cases, a first TCI-state of the tuple corresponds to a first port group of the set of port groups and a second TCI-state of the tuple corresponds to a second port group of the set of port groups. In some examples, the port group manager 630 may in some cases, a TCI-state of the tuple corresponds to each of the set port groups. In some examples, the port group manager 630 may in some cases, the set of TCI-state sets correspond to different reference signals of the second reference signal set.

Figure 7:
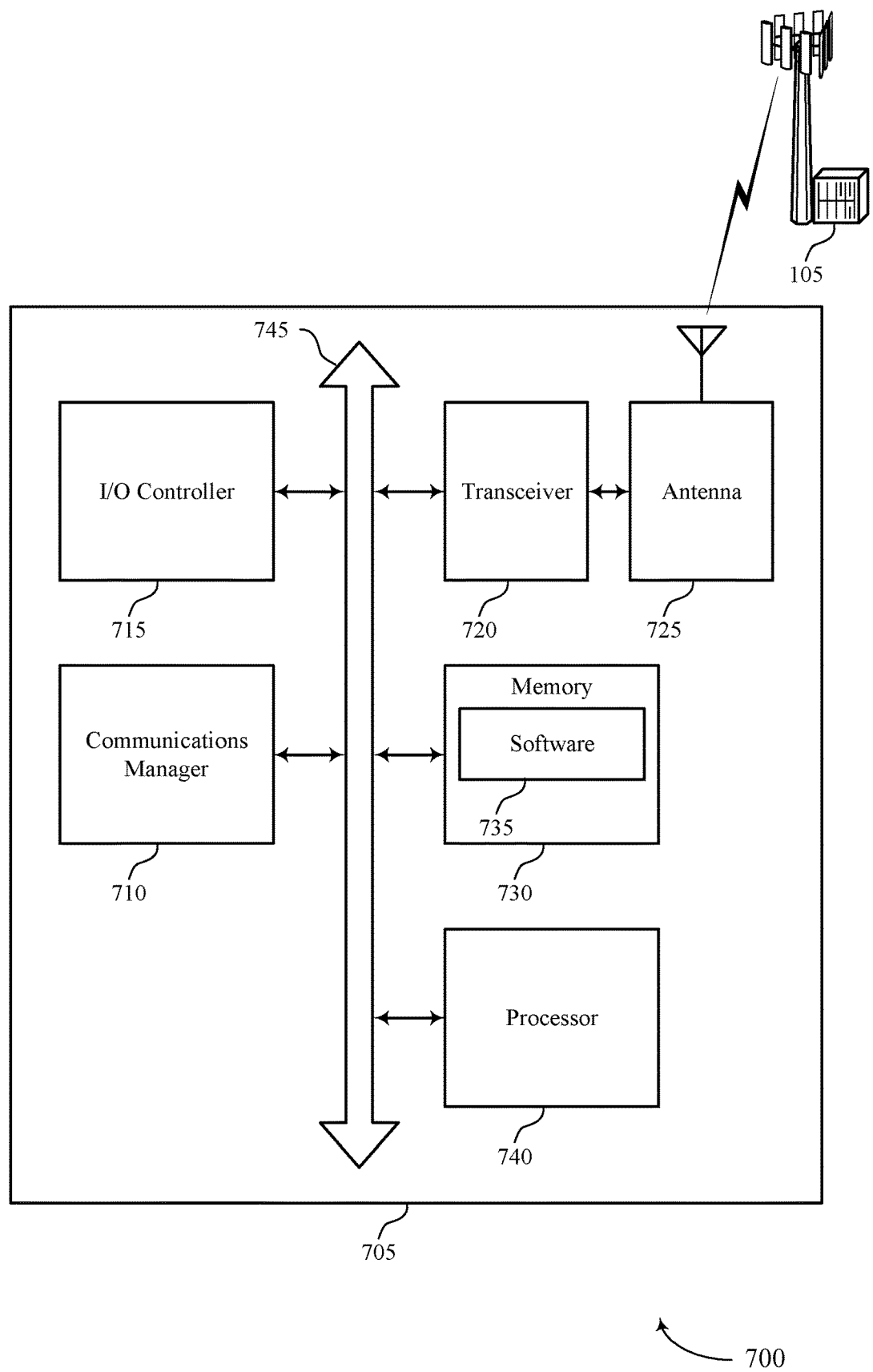
FIG. 7 illustrates a block diagram of a system including a user equipment (UE) that supports TCI-states indicating QCL groups in accordance with aspects of the present disclosure.

FIG. 7 shows a diagram of a system 700 including a device 705 that supports TCI-states indicating QCL groups in accordance with aspects of the present disclosure. Device 705 may be an example of or include the components of UE 405, UE 505, or a UE 115 as described above, e.g., with reference to FIGS. 4 and 5. Device 705 may include components for bi-directional voice and data communications including components for transmitting and receiving communications, including communications manager 710, I/O controller 715, transceiver 720, antenna 725, memory 730, and processor 740. These components may be in electronic communication via one or more buses (e.g., bus 745).

I/O controller 715 may manage input and output signals for device 705. I/O controller 715 may also manage peripherals not integrated into device 705. In some cases, I/O controller 715 may represent a physical connection or port to an external peripheral. In some cases, I/O controller 715 may utilize an operating system such as iOS®, ANDROID®, MS-DOS®, MS-WINDOWS®, OS/2®, UNIX®, LINUX®, or another known operating system. In other cases, I/O controller 715 may represent or interact with a modem, a keyboard, a mouse, a touchscreen, or a similar device. In some cases, I/O controller 715 may be implemented as part of a processor. In some cases, a user may interact with device 705 via I/O controller 715 or via hardware components controlled by I/O controller 715.

Transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

Memory 730 may include RAM and ROM. The memory 730 may store computer-readable, computer-executable software 735 including instructions that, when executed, cause the processor to perform various functions described herein. In some cases, the memory 730 may contain, among other things, a BIOS which may control basic hardware or software operation such as the interaction with peripheral components or devices.

Processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 740 may be configured to operate a memory array using a memory controller. In other cases, a memory controller may be integrated into processor 740. Processor 740 may be configured to execute computer-readable instructions stored in a memory to perform various functions (e.g., functions or tasks supporting TCI-states indicating QCL groups).

Figure 8:
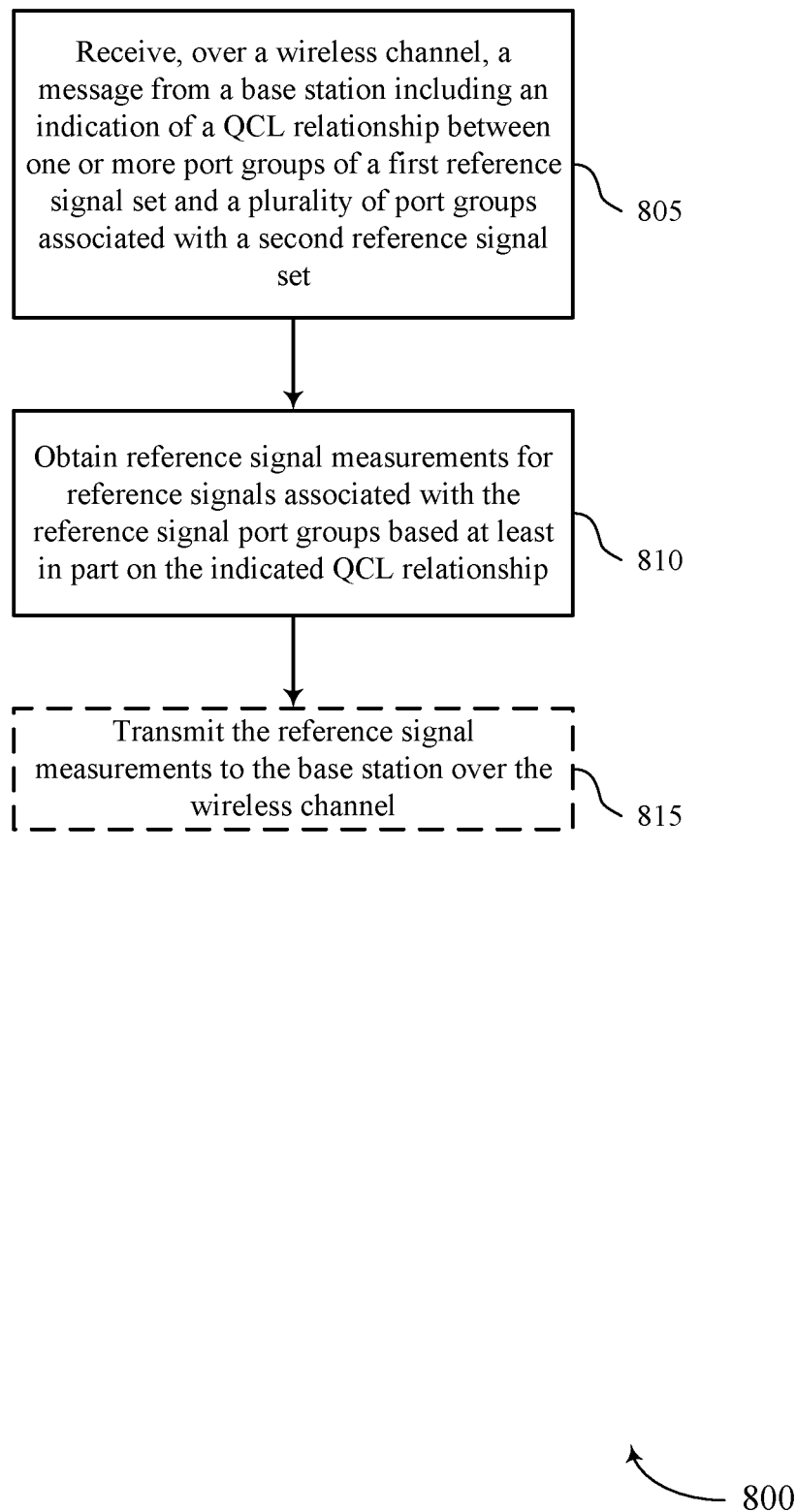
FIG. 8 illustrates a method for TCI-states indicating QCL groups in accordance with aspects of the present disclosure.

FIG. 8 shows a flowchart illustrating a method 800 for TCI-states indicating QCL groups in accordance with aspects of the present disclosure. The operations of method 800 may be implemented by a UE or its components as described herein. For example, the operations of method 800 may be performed by a communications manager as described with reference to FIGS. 4 to 7. In some examples, a UE may execute a set of codes to control the functional elements of the device to perform the functions described below. Additionally or alternatively, the UE may perform aspects of the functions described below using special-purpose hardware.

At 805 the UE may receive, over a wireless channel, a message from a base station including an indication of a QCL relationship between one or more port groups of a first reference signal set and a plurality of port groups associated with a second reference signal set. The operations of 805 may be performed according to the methods described herein. In certain examples, aspects of the operations of 805 may be performed by a QCL manager as described with reference to FIGS. 4 to 7.

At 810 the UE may obtain reference signal measurements for reference signals associated with the reference signal port groups based at least in part on the indicated QCL relationship. The operations of 810 may be performed according to the methods described herein. In certain examples, aspects of the operations of 810 may be performed by a reference signal measurement manager as described with reference to FIGS. 4 to 7.

At 815 the UE may optionally transmit the reference signal measurements to the base station over the wireless channel. In cases where the UE does not transmit the reference signal to the base station, the UE may process the reference signal measurements (e.g., at 815) that were obtained at 810 according to the QCL relationship indication received at 805. The operations of 815 may be performed according to the methods described herein. In certain examples, aspects of the operations of 815 may be performed by a transmitter as described with reference to FIGS. 4 to 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, over a wireless channel, a message from a base station comprising an indication of a quasi-collocation (QCL) relationship between a first port groups of a first reference signal set and each of a second port groups associated with a second reference signal set;
   obtaining, by the UE, reference signal measurements for the first reference signal sets and the second reference signal sets associated with the first port groups and the second port groups based at least in part on the indicated QCL relationships; and
   receiving a tuple of transmission configuration indication (TCI) states as a configuration unit for the first reference signal set with a fixed order of mapping for each TCI state in the tuple;
   wherein the fixed order of mapping indicates that a first TCI state of the tuple of the TCI states corresponds to one of the first port groups and a second TCI state of the tuple of the TCI states corresponds to one of the second port groups.

2. The method of claim 1, further comprising:
   receiving a radio resource control (RRC) message indicating a common pool of TCI states.

3. The method of claim 2, wherein the RRC message comprises a media access control (MAC) control element (CE) command.

4. The method of claim 1, further comprising:
   receiving a radio resource control (RRC) message comprising a sequence indicating the correspondence.

5. The method of claim 1, wherein receiving the tuple further comprises:
   receiving a media access control (MAC) control element (CE) command, the MAC CE comprising a configuration of the tuple.

6. The method of claim 1, wherein at least one of the TCI states of the tuple corresponds to two or more of the plurality of port groups.

7. The method of claim 1, further comprising:
   receiving a transmission configuration indication (TCI) state for the first reference signal set, wherein the TCI state indicates each of the plurality of port groups associated with the second reference signal set.

8. The method of claim 7, wherein the TCI state comprises a plurality of TCI state sets, and wherein the TCI state sets correspond to different port groups of the plurality of port groups.

9. The method of claim 8, wherein the plurality of TCI state sets correspond to different reference signals of the second reference signal set.

10. The method of claim 8, wherein the plurality of TCI state sets comprises a TCI state set that corresponds to each of the plurality of port groups associated with the second reference signal set.

11. The method of claim 1, wherein receiving the message from the base station comprising the indication of the QCL relationship further comprises:
   receiving, a first indication of a first QCL relationship between a first subset of the first reference signal set and a first subset of the plurality of port groups; and
   receiving, a second indication of a second QCL relationship between a second subset of the first reference signal set and a second subset of the plurality of port groups.

12. The method of claim 1, wherein the first reference signal set comprises a synchronization signal block (SSB) set, a tracking reference signal (TRS) set, or a channel state information reference signal (CSI-RS).

13. The method of claim 1, wherein the second reference signal set comprises a demodulation reference signal (DM-RS) of a physical downlink shared channel (PDSCH), a DM-RS of a physical downlink control channel (PDCCH), or a channel state information reference signal (CSI-RS) reference set.

14. The method of claim 1, wherein the one or more port groups of the first reference signal set are associated with a first downlink control information (DCI) field of a DCI, and the plurality of port groups associated with the second reference signal set are associated with a second DCI field of the DCI.

15. The method of claim 14, wherein the first DCI field of the DCI is associated with a first transmission configuration indication (TCI) state of the one or more port groups of the first reference signal set, and the second DCI field of the DCI is associated with a second TCI state of the plurality of port groups.

16. An apparatus for wireless communications, comprising:
   a processor,
   memory in electronic communication with the processor; and
   instructions stored in the memory and executable by the processor, to cause the apparatus to:
   receive, over a wireless channel, a message from a base station comprising an indication of a quasi-collocation (QCL) relationship between a first port groups of a first reference signal set and each of a second port groups associated with a second reference signal set;
   obtain, by the UE, reference signal measurements for the first reference signal sets and the second reference signal sets associated with the first port groups and the second port groups based at least in part on the indicated QCL relationships; and
   receive a tuple of transmission configuration indication (TCI) states as a configuration unit for the first reference signal set with a fixed order of mapping for each TCI state in the tuple;
   wherein the fixed order of mapping indicates that a first TCI state of the tuple of the TCI states corresponds to one of the first port groups and a second TCI state of the tuple of the TCI states corresponds to one of the second port groups.

17. The apparatus of claim 16, wherein the instructions are further executable by the processor to cause the apparatus to:
   receive a radio resource control (RRC) message indicating a common pool of TCI states.

18. The apparatus of claim 17, wherein the RRC message comprises a media access control (MAC) control element (CE) command.

19. The apparatus of claim 16, wherein the instructions are further executable by the processor to cause the apparatus to:
   receive a radio resource control (RRC) message comprising a sequence indicating the correspondence.

20. The apparatus of claim 16, wherein the instructions to receive the tuple further are executable by the processor to cause the apparatus to:
   receive a media access control (MAC) control element (CE) command, the MAC CE comprising a configuration of the tuple.

21. The apparatus of claim 16, wherein at least one of the TCI states of the tuple corresponds to two or more of the plurality of port groups.

22. The apparatus of claim 16, wherein the first reference signal set comprises a synchronization signal block (SSB) set, a tracking reference signal (TRS) set, or a channel state information reference signal (CSI-RS).

23. The apparatus of claim 16, wherein the one or more port groups of the first reference signal set are associated with a first downlink control information (DCI) field of a DCI, and the plurality of port groups associated with the second reference signal set are associated with a second DCI field of the DCI.

24. The apparatus of claim 23, wherein the first DCI field of the DCI is associated with a first transmission configuration indication (TCI) state of the one or more port groups of the first reference signal set, and the second DCI field of the DCI is associated with a second TCI state of the plurality of port groups.

25. An apparatus for wireless communications, comprising:
   means for receiving, over a wireless channel, a message from a base station comprising an indication of a quasi-collocation (QCL) relationship between a first port groups of a first reference signal set and each of a second port groups associated with a second reference signal set;
   means for obtaining, by the UE, reference signal measurements for the first reference signal sets and the second reference signal sets associated with the first port groups and the second port groups based at least in part on the indicated QCL relationships; and
   means for receiving a tuple of transmission configuration indication (TCI) states as a configuration unit for the first reference signal set with a fixed order of mapping for each TCI state in the tuple;
   wherein the fixed order of mapping indicates that a first TCI state of the tuple of the TCI states corresponds to one of the first port groups and a second TCI state of the tuple of the TCI states corresponds to one of the second port groups.

26. A non-transitory computer-readable medium storing code for wireless communications, the code comprising instructions executable by a processor to:

receive, over a wireless channel, a message from a base station comprising an indication of a quasi-collocation (QCL) relationship between a first port groups of a first reference signal set and each of a second port groups associated with a second reference signal set;

obtain, by the UE, reference signal measurements for the first reference signal sets and the second reference signal sets associated with the first port groups and the second port groups based at least in part on the indicated QCL relationships; and receive a tuple of transmission configuration indication (TCI) states as a configuration unit for the first reference signal set with a fixed order of mapping for each TCI state in the tuple;

wherein the fixed order of mapping indicates that a first TCI state of the tuple of the TCI states corresponds to one of the first port groups and a second TCI state of the tuple of the TCI states corresponds to one of the second port groups.

* * * * *